Nov. 29, 1938.     W. E. TRUMPLER     2,138,220
INTERNAL COMBUSTION TURBINE
Filed Dec. 12, 1935     8 Sheets-Sheet 1
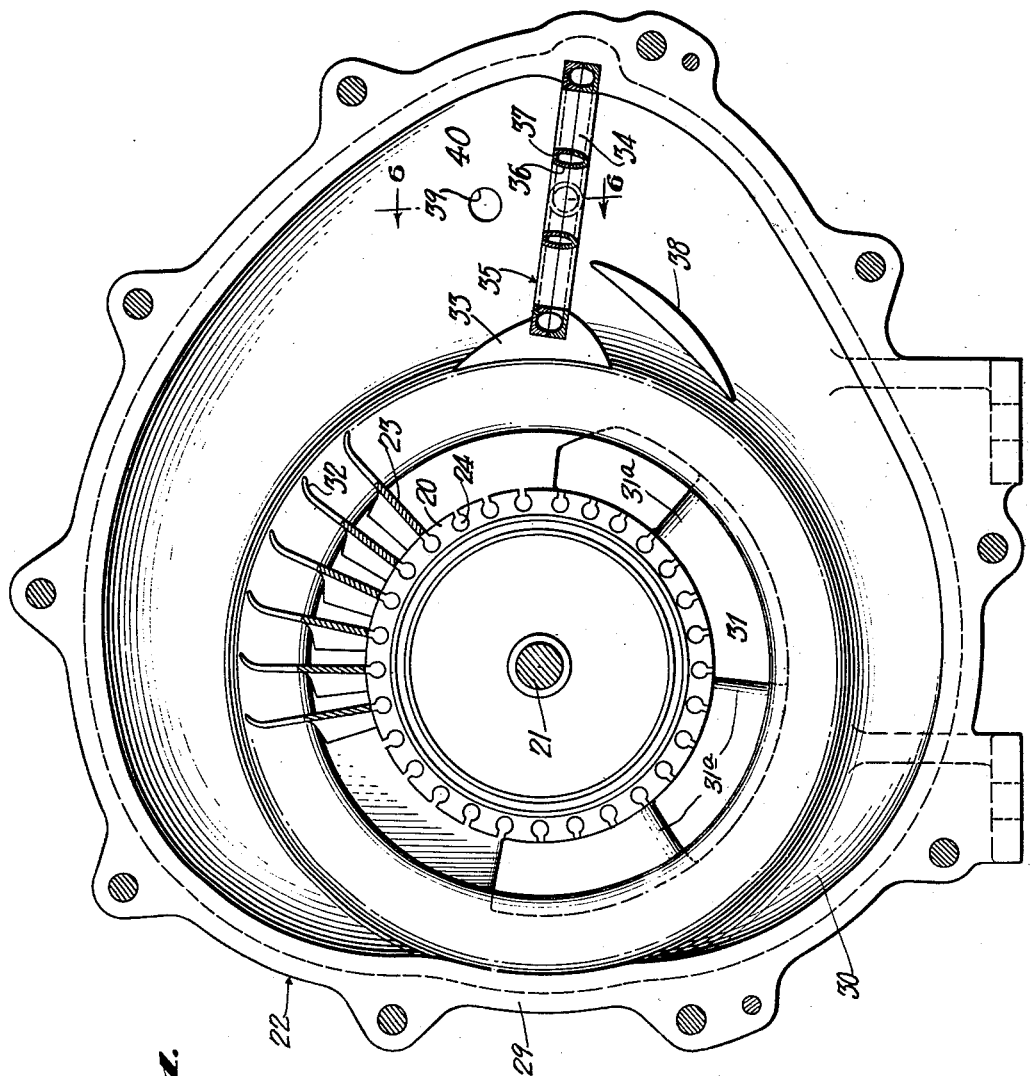
INVENTOR.
WILLIAM E. TRUMPLER.
BY
ATTORNEYS

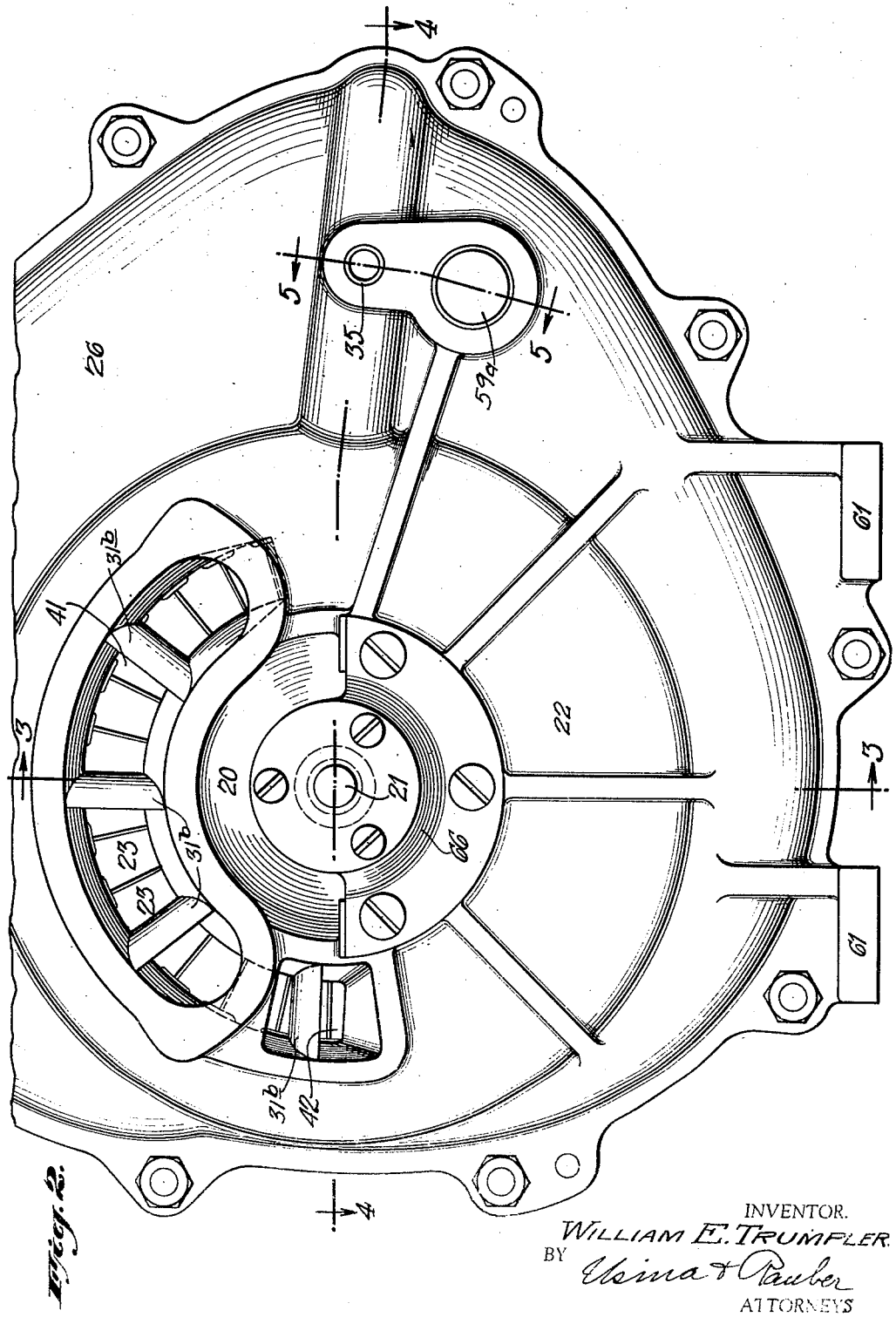

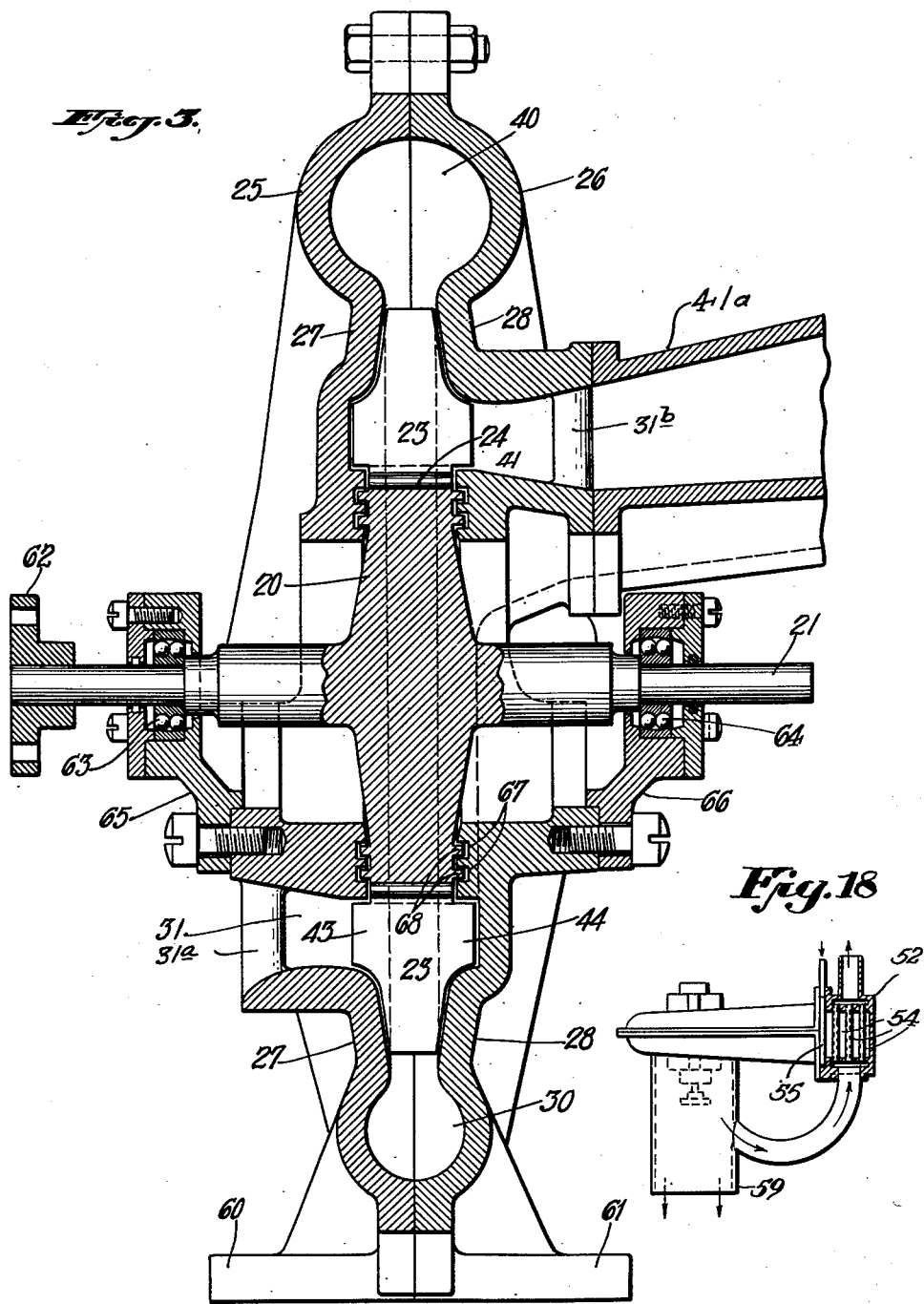

Nov. 29, 1938.  W. E. TRUMPLER  2,138,220
INTERNAL COMBUSTION TURBINE
Filed Dec. 12, 1935  8 Sheets-Sheet 4
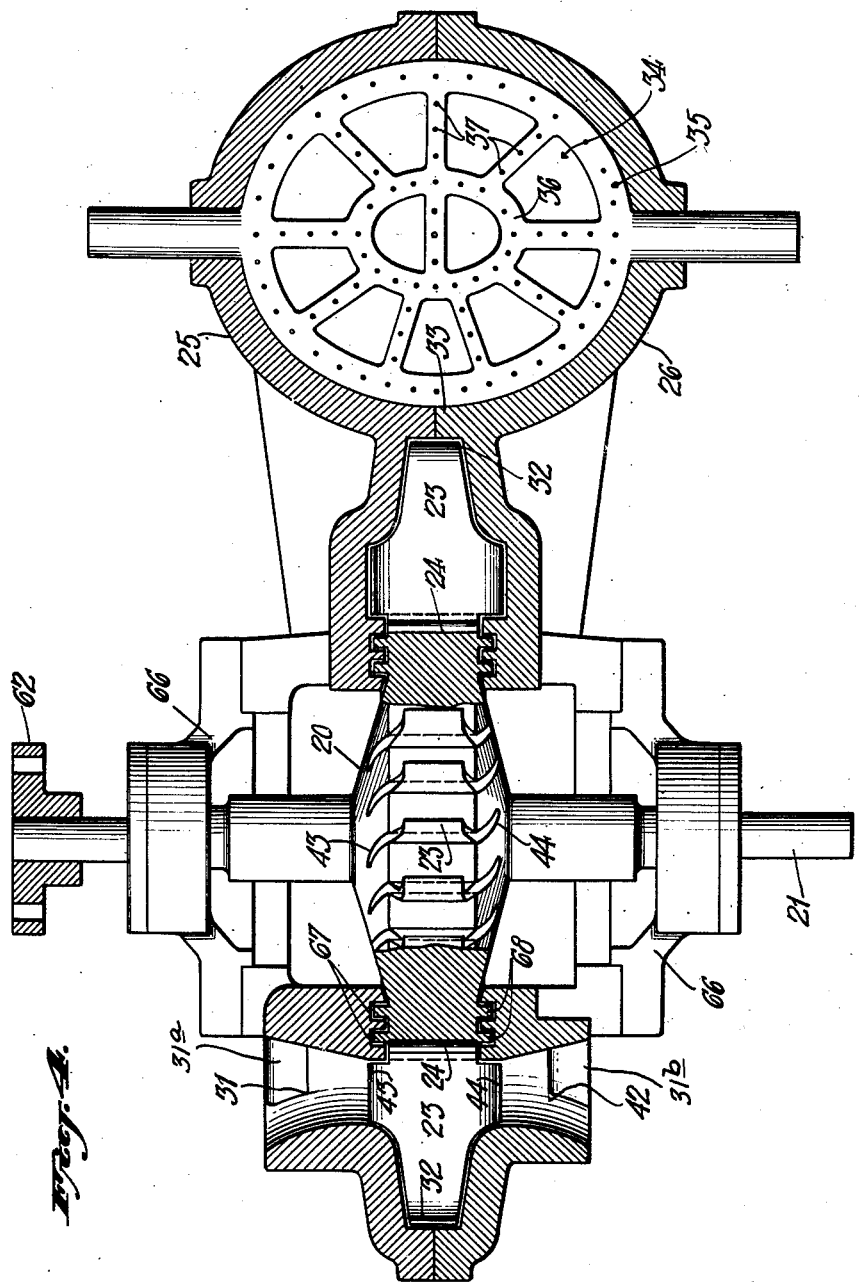
INVENTOR.
WILLIAM E. TRUMPLER.
BY
ATTORNEYS

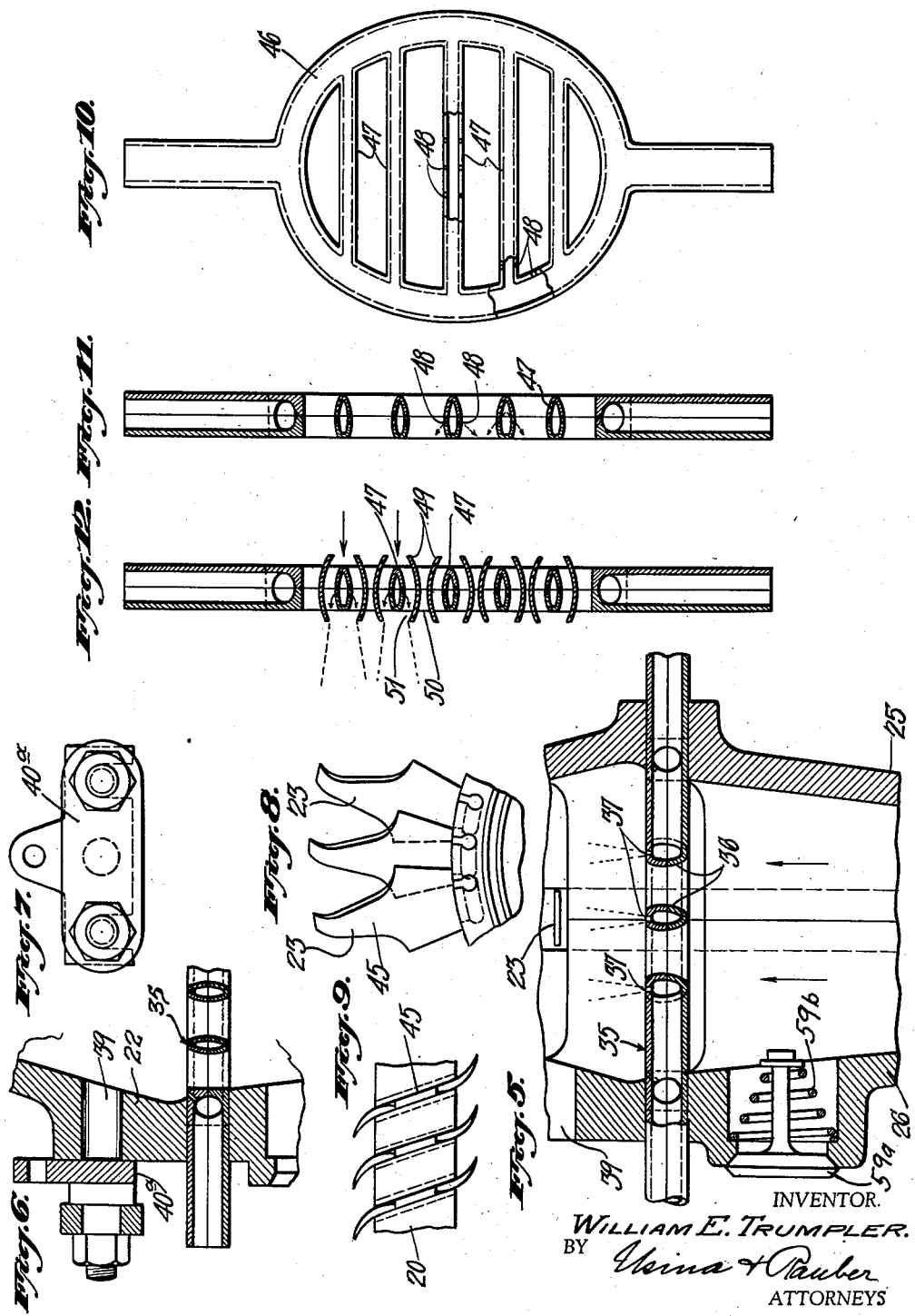

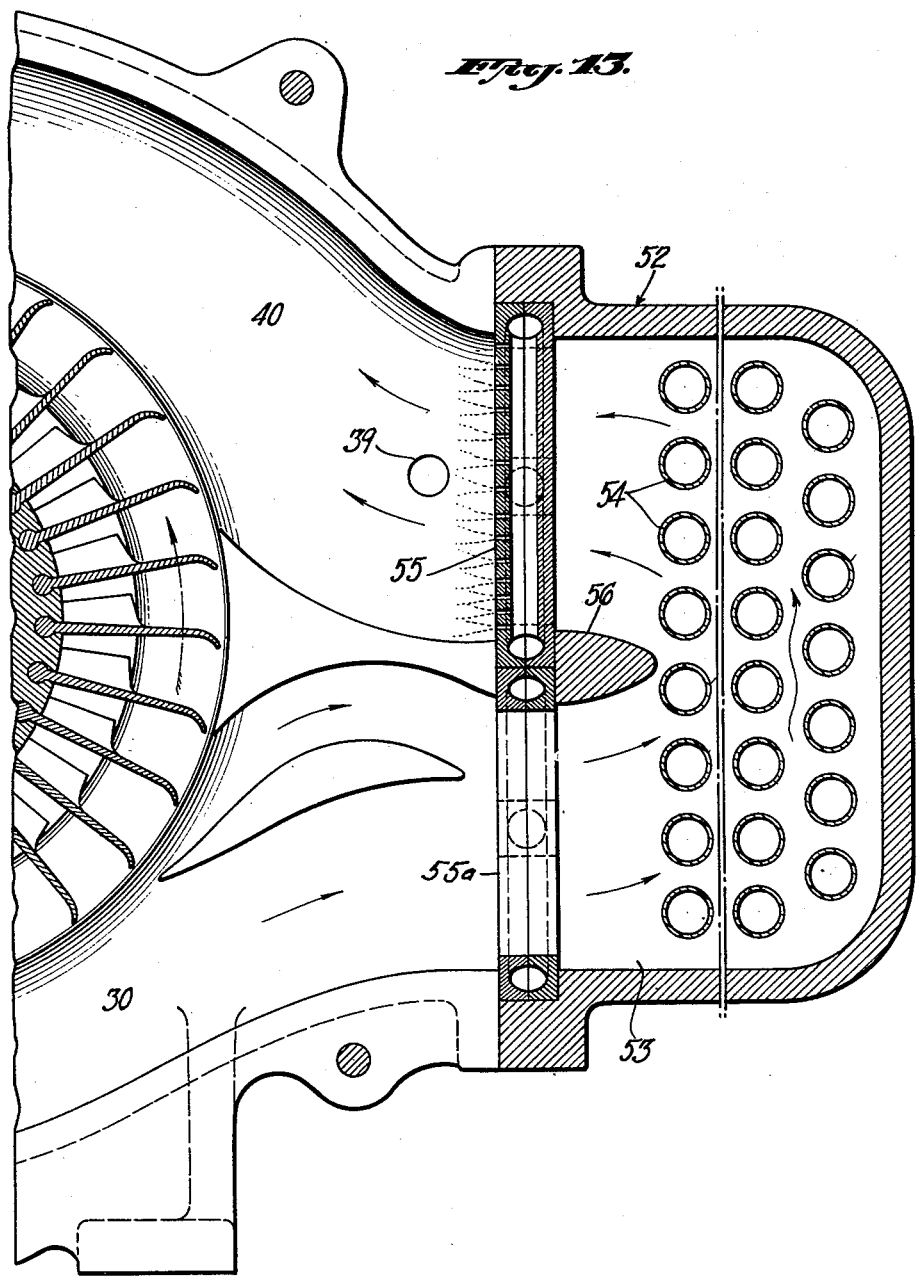

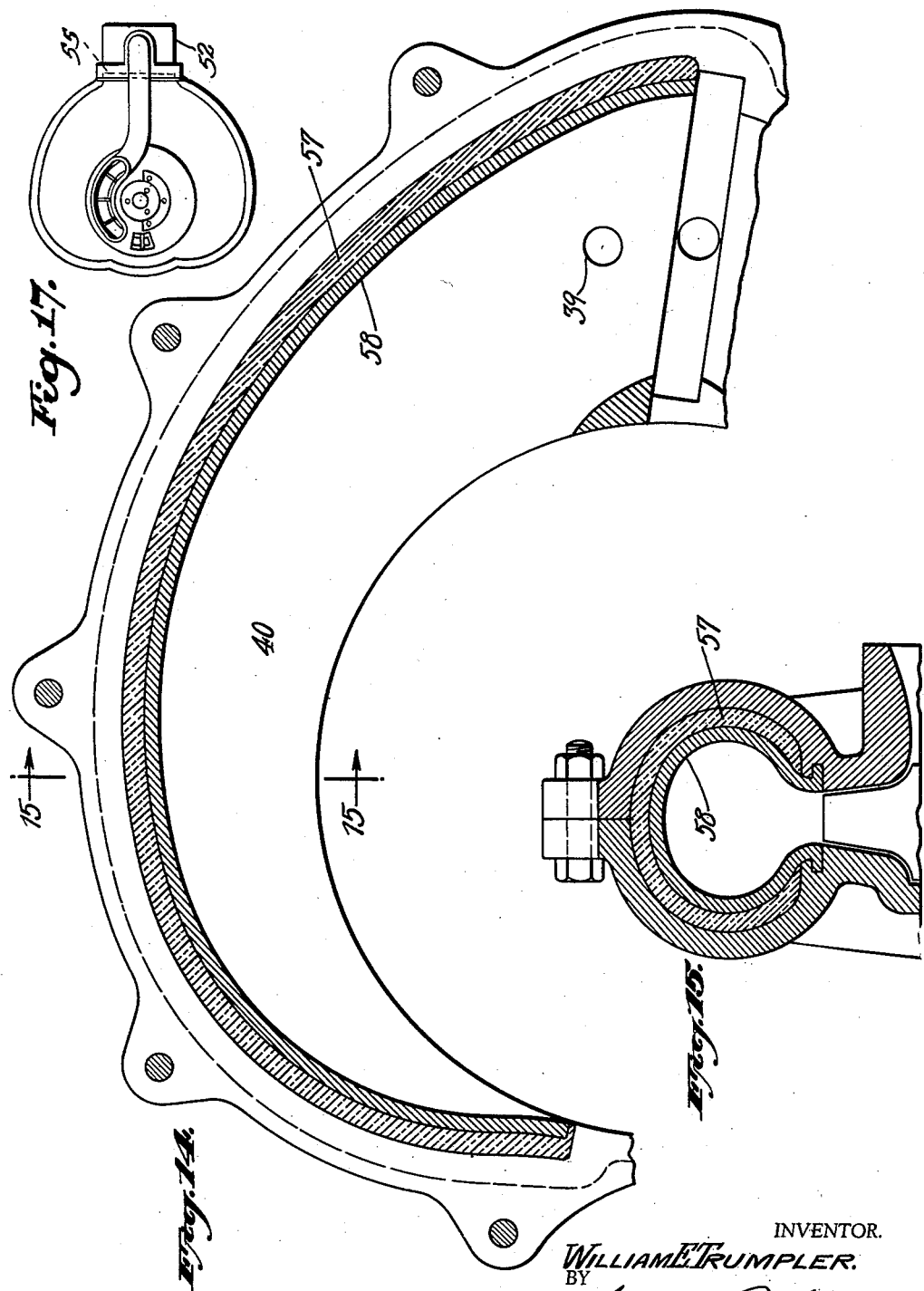

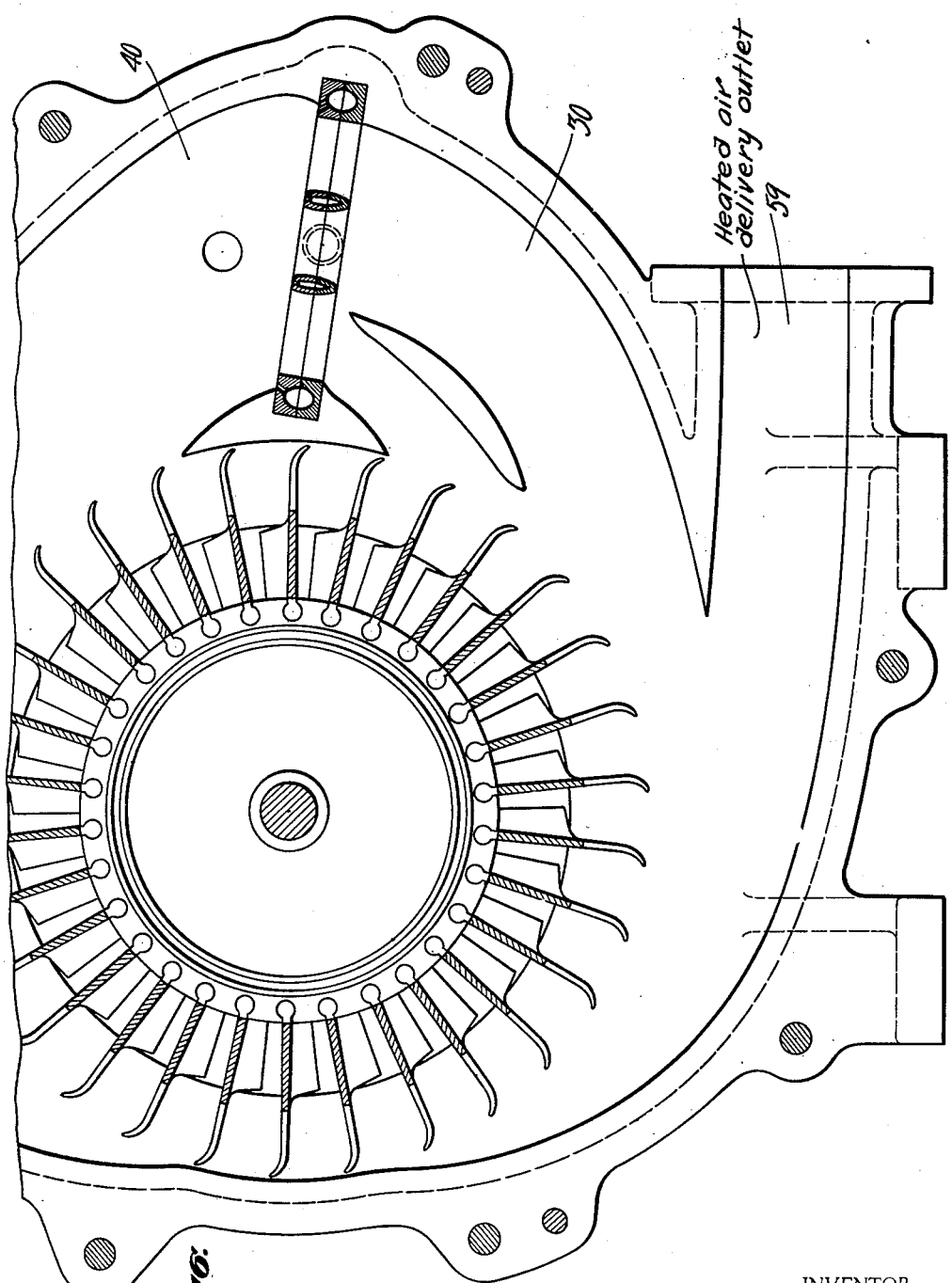

Patented Nov. 29, 1938

2,138,220

UNITED STATES PATENT OFFICE 2,138,220

INTERNAL COMBUSTION TURBINE

William E. Trumpler, Easton, Pa.

Application December 12, 1935, Serial No. 54,078

5 Claims. (Cl. 60—41)

My invention relates to an internal combustion turbine, that is, one in which the energy of combustion of a fuel is transformed into kinetic energy in the products of combustion and then imparted directly to a rotor of the turbine.

An internal combustion turbine of this general type has certain potential advantages over steam turbines inasmuch as the necessity for generating steam, with its attendant heat losses and the extensive equipment required for this purpose, is avoided and it also has certain potential advantages over a reciprocating type of internal combustion engine, at least for certain purposes, in that it avoids changes of a momentum, problems in ignition and complexities in construction. Obstacles have, however, heretofore prevented a practical realization to any considerable extent of these potential advantages. Among these obstacles are the difficulty of obtaining a rapid and efficient combustion of the fuel under such conditions as to transform its energy largely into kinetic energy applicable to the driving of the turbine and to the excessive heating of the turbine blades by the hot products of combustion.

The obstacles are however obviated by my present invention which provides a simple and efficient apparatus in which the energy of combustion is applied efficiently to the rotor of the turbine under such conditions as to avoid excessive overheating of the rotor and burning of the turbine blades.

The various features of the invention are illustrated in the accompanying drawings in which—

Fig. 1 is a vertical section through a turbine embodying a preferred form of the invention; Fig. 2 is a side view of the turbine shown in Fig. 1; Figs. 3, 4 and 5 are sectional views taken on the lines 3—3, 4—4 and 5—5 of Fig. 2; Fig. 6 is a detail sectional view taken on a plane transverse to that of the burner through a part of the turbine wall showing an ignition opening, shown by the section line 6—6 of Figure 1; Fig. 7 is a side view showing a closure of the ignition opening; Fig. 8 is a side view and Fig. 9 an end view of a modified form of turbine blade; Fig. 10 is a front view and Fig. 11 a vertical section of a burner forming a part of the turbine; Fig. 12 is a sectional view similar to that of Fig. 11 of a modified form of burner; Fig. 13 is a sectional view through the combustion part of the turbine showing a heat interchanger element; Fig. 14 is a modified form of turbine casing element having a refractory lining; Fig. 15 is a sectional view of the turbine casing taken on line 15—15 of Fig. 14; Fig. 16 is a sectional view or a half of a modified form of turbine designed particularly to deliver an air blast; Fig. 17 is a side view on a smaller scale of a turbine having a preheating connection to the exhaust, and Fig. 18 is a plan view of the turbine of Fig. 17 being shown in section through a heat interchanger element.

In my invention the rotor acts throughout a part of its cycle of rotation as a centrifugal pump to force air under pressure to a burner element in which it is mixed with fuel and then ignited. The combustion products thus formed are directed back onto the blades of the rotor in a succeeding part or half of the cycle of rotation to drive the rotor and is then exhausted. Accordingly, in each cycle, after the blades of the rotor have been impinged by the hot products of combustion in the turbine or driving half they are swept immediately with relatively cool air in the centrifugal pump half. As the speed of rotation is high the blades are cooled instantly after their contact with the hot products of combustion and therefore remain at a relatively low temperature in contrast to the temperature that would be obtained if the blades were continuously subjected to the hot blast without an intermediate cooling. In the burner element the fuel is distributed to spaced conduits each having a large number of outlet orifices or jets so directed as to cause the jets of fuel to intersect or pierce the stream of air flowing to the turbine half and be immediately mixed with the air and ignited. The energy set free by the combustion is immediately absorbed in the product of combustion causing its temperature to rise and assuming a larger volume. The pressure produced by the centrifugal pump cycle applies now to the hot gases of lower density and will therefore develop higher velocity during expansion and deliver an excess amount of power to the wheel over the power absorbed by the compression of the cool air.

In some cases the turbine may be so proportioned as merely to drive the rotor and apply a blast of air. In this case the fuel will be so proportioned to the air supply as to furnish only sufficient energy to drive the rotor as a fan or blower. It will be understood that the shaft will be rotated at the start so as to supply a blast of air under pressure initially to the burner. Thereupon the ignition and combustion of the fuel will supply the energy required to bring the rotor up to the required speed and to supply the power as it is generated.

Referring more particularly to the embodiment of the invention shown in Figs. 1 to 7 inclusive, a rotor 20 is mounted on a shaft 21 within a casing 22. The rotor 20 is provided with a number of impeller blades 23 projecting outwardly at spaced intervals from the periphery of the rotor. The impeller blades 23 may be mounted on the rotor 20 in any suitable way, as for example, by interlocking into grooves 24 spaced about the periphery of the rotor.

The casing 22 which may be made of two complementary parts 25 and 26 has side walls that conform closely to the side edges of the impeller blades 23 as at 27 and 28 with just sufficient clearance to permit free rotation of the rotor and blades. At one part in the periphery of the rotor as at 29 the casing also conforms to and is but slightly spaced from the ends or peripheral edges of the impeller blades 23 and from this point increases in radial dimension to form an air passage 30 of gradually increasing cross-sectional dimensions to a point approximately diametrically opposite the point 29. An air inlet 31 is provided in the wall 25 near the base of the impeller blades 23 from the point 29 to approximately the diametrically opposite point. When the rotor is rotated counter-clockwise therefore the impeller blades 23 will draw air in through the inlet 31 and throw it centrifugally outwardly into the channel 30. The blades may be curved backwards to provide more efficient compression. Stationary guide vanes 31a may also be placed in the air inlet passage 31 to provide a positive guide to the air approaching the bladed wheel.

It will therefore be apparent that the rotation of the rotor 20 and impeller blades 23 serves to draw in air through the inlet 31 and force it at an increased pressure into the passage 30. The air under pressure then flows counter-clockwise through the enlarged area of the passage 30.

At a point diametrically opposite the point 29 the passage 30 is separated from the impeller blades 23 by a partition 33 which at this point completes the circumference of the passage 30 and forms a combustion space 34 as shown in cross-section in Fig. 4. In the combustion space thus formed there is provided a transverse burner or grid 35 which divides the combustion space 34 into a number of small passages between the hollow arms 36 of the grid to which a combustible fuel is supplied and from which it issues in a number of small ports 37 so that it immediately mixes with the air under pressure from the passage 30. In order to prevent undue turbulence and loss of energy by internal friction one or several deflecting vanes 38 may be provided in the passage 30 immediately in advance of the grid 35. As the air passes through the grid 35 it becomes intimately admixed with fuel and is ignited and burned. An ignition opening 39 is provided immediately following the grid 35 to permit the insertion of an ignition agent to start combustion, this opening 39 being closed by a suitable closure 40a as shown in Figs. 6 and 7. Since the combustion is continuous ignition is only required at the beginning of the operation of the turbine.

The combustion of the fuel and air immediately raises the temperature and causes an expansion and decrease in density of the resulting products of combustion. This lower density will cause an increased velocity during expansion, the velocity being inverse proportional to the square root of the density of the gases.

The hot products of combustion are received in a turbine chamber 40 extending from the grid 35 to the opposite point 29 and decreasing in radial dimensions progressively toward the point 29. An exhaust passage 41 from the turbine chamber 40 is provided in the wall 26 through which the products of combustion may escape. This opening 41 may extend from a point shortly beyond grid 35 beyond point 29 to permit a cross flow of air from the intake opening 31 to the extension of the exhaust passage 41. This extension of the exhaust opening may be separated from 41 and form a second opening 42. The outlets 41 and 42 are provided near the bases of the impeller blades 23 so that in the flow of the products of combustion to the outlets they impinge on the impeller blades and create a rotational pressure in excess of that required to rotate the rotor in the opposite half of its point of rotation when it serves to pump or blow air toward the combustion chamber.

It will be understood that for the highest efficiencies the turbine half of the chamber and rotor is designed to convert a maximum of the energy of combustion into kinetic energy and velocity of the products of combustion and to exhaust these gases with a minimum of tangential velocity and with a minimum of internal friction. Since exhaust velocity usually will be comparatively high a diffuser 41a will be added converting the velocity into a pressure differential. Stationary vanes 31b may be provided in opening 41 and 42 to assist in directing the gases into the diffuser. The curvature of the blades 23 may aid in directing the products of combustion with a minimum of eddying or internal friction against the blades 23. It will be understood, however, that straight blades or blades curved in other ways may be employed.

As shown in Figs. 3 and 4 the edges of the impeller blades 23 adjacent the wall 27 may be curved forwardly as at 43 so as to give a slight sideways component of force inwardly from the opening 31 thus tending to facilitate the drawing in of air being impelled by the blades 23. The opposite edges 44 of the blades 23 are bent backwardly so as to give an outward thrust to air being expelled or exhausted through the ports 41 and 42. The rotor may, therefore, be run at such a speed as to leave only a small outwardly sideways thrust just sufficient to expel the product of combustion through the outlets 41 and 42 and thus all of the energy might be absorbed by the impeller blades.

In the form of embodiment of the invention shown in Figs. 8 and 9 the impeller blades 23 are positioned obliquely as at 45 so as to improve the curvature of the blade channel.

In order to transform the heat of combustion of the fuel most efficiently into kinetic energy of the products of combustion the combustion should be as nearly instantaneous as possible so that flaming and but partly consumed fuel shall not be carried directly into contact with the vanes 32 and outwardly through the outward passages 41 and 42 and thus result in a loss of energy. The fine division of the fuel by the grid 35 enables it to be mixed immediately with the compressed air delivered from the passage 30 and be thoroughly burned before reaching the rotor blades. The expansion of the combustion gases will drop the temperature somewhat as part of the heat energy is converted into kinetic energy.

Various forms of grid may be employed. Instead of the grid having circular and radial arms as illustrated in Fig. 4 the grid may be provided with an outer hollow frame 46 and a number of spaced parallel hollow arms 47. Instead of having the ports at one edge they may be positioned at the sides of the grid arms, such as the ports 48 of Fig. 11, so that jets will intersect and cut into the air passing between the arms of the grid. As shown in Fig. 12, curved intermediate blades 49 may be inserted between the arms 47 so as to provide Venturi channels 50 for secondary air supply and passages 51 immediately about the arms 47 for primary air. This will permit a more rapid mixing of the fuel in the channels 51 and an even distribution of this air into the secondary air streams passing through the Venturi passages 50.

The exhaust products of combustion leaving outlet ports 41 and 42 necessarily retain some residual heat which, if exhausted directly to the atmosphere, would constitute a loss of energy. To recover this energy and apply it usefully a heat interchanger 52 as shown in Fig. 13 may be provided between the blower passage 30 and the turbine passage 40. For this purpose the blower passage 30 is directed into a casing 53 of the heat interchanger through which pass a number of transverse tubes 54 preferably staggered in opposite rows. The air supplied from the passage 30 passes about the outer surfaces of the tube 54 while the hot gases from the exhaust ports or other sources may pass through the interior tubes 54 thus heating the air received from the chamber. This air passes directly to a burner grid 55. The fuel may also be preheated by admitting a small part of it insufficient to sustain combustion through a grid 55a into the stream of air flowing from the passage 30 into the heat interchanger 52 and thence into the combustion zone where it is mixed with additional quantities of fuel from burner 55. Not only does this free heating of the air increase the energy content and temperature of the air supply but also aids in the rapid mixing and combustion of the fuel. A baffle partition 56 may be provided in the casing 52 to prevent shunting of air through the casing without contact to the tubes 54.

The impeller blades 23 are only in contact with the hot gases for a minute fraction of a second and are then immediately contacted with the incoming cool air in the blower chamber so that the heat does not have time to penetrate into and remain in the impeller bades but is immediately throw off into the incoming air which passes over the blades with a high velocity and therefore with the most efficient absorption of heat. The outer surface of the turbine chamber 40 is however continuously in contact with the hot products of combustion and may become heated to a high temperature. The inner surface of this chamber is therefore lined with a heat resistant metal or refractory material 58. This lining is spaced from the casing 22 by a flexible or plastic heat insulation 57 to permit the lining to expand or contract without interference and causing no strain in the casing 22. In this manner the body of the walls 25 and 26 of the casing is protected from overheating and remains at a relatively low temperature and with substantially undiminished strength.

In some cases it may be desired to use the turbine only to supply a blast of air, that is, a part of the air supplied in the chamber may be withdrawn for an industrial application and only the balance burned to supply the energy for driving the rotor. Such an arrangement is shown in Fig. 16 which has an outlet 59 from the chamber 30 through which all of the air is withdrawn except that required to keep the rotor in motion after being combined with fuel and supplied to the turbine chamber 40.

The speed of the turbine may be controlled by means of a pressure release valve 59a which opens outwardly from the chamber 27 against the pressure of a spring 59b so that whenever the speed of the rotor reaches a predetermined limit the increased pressure generated thereby in the chamber 30 will open the valve 59a and permit a part of the air to escape thereby decreasing the energy supplied to the turbine vanes and preventing further increase in velocity.

Any suitable construction may be used for the turbine casing and rotor. In the preferred embodiment shown in the accompanying drawings the casing halves 25 and 26 are provided with complementary parts 60 and 61 of a supporting base. The rotor 20 is supported on a rotatable shaft 21 projecting from opposite sides of the rotor and mounted in frictionless bearings 63 and 64 on brackets 65 and 66 secured to the casing halves 25 and 26 respectively. A coupling 62 may be provided on either or both shaft ends to transmit the power developed to the driven shaft. The casing halves have concentric grooves 67 which receive concentric ridges 68 of the rotor 20 so as to seal the rotor in the casing while permitting it to rotate freely.

Through the above invention I have provided a turbine of very simple construction in which the energy of the fuel is transformed efficiently into kinetic energy and thence transformed to a rotor while at the same time the combustion of the fuel is efficient and the overheating of the impeller blades is substantially prevented.

What I claim is:

1. An internal combustion turbine which comprises a rotor having impeller blades spaced about its periphery, a casing enclosing said rotor and impeller blades and forming a space about a part of the circumference of said rotor to receive air compressed by said impeller blades and forming a turbine space about the balance of said circumference, said casing having an inlet in one side wall entering said air-receiving space and having an outlet in the opposite wall of said casing from said turbine space and having a combustion zone between said air-receiving space and said turbine space and means in said combustion zone to admix and ignite air and fuel, said inlet and outlet overlapping between the turbine and compressor spaces on the side opposite the combustion chamber, and said impeller blades having surfaces inclined to cause a scavenging current of air to pass crosswise of said blades from said inlet to said outlet.

2. An internal combustion turbine which comprises a rotor disc, impeller blades extending outwardly from its periphery, a casing enclosing said impeller blades, said casing expanding radially outwardly from said impeller blades throughout approximately half of the periphery of said rotor to form a space to receive air compressed by said impeller blades and contracting throughout the remaining part of said periphery to form a turbine space, means for burning fuel in said compressed air between said air-receiving and said turbine space at the enlarged part thereof, an air inlet to said air-receiving space in one side wall of said casing, an exhaust outlet in the opposite wall of said casing from the turbine compartment, said inlet and outlet overlapping in the part of said casing diametrically opposite said fuel means, said openings being at the base of said impeller blades immediately adjacent the periphery of the rotor disc, said impeller blades having inclined areas at the bases of the blades to draw a scavenging current of air crosswise from the overlapping part of said inlet to the overlapping part of said outlet.

3. An internal combustion turbine which comprises a rotor having impeller blades projecting outwardly from its periphery at circumferentially spaced intervals, a casing enclosing said blades and sealed to said rotor, said casing expanding throughout a part of its circumference to form a space for air compressed by said impeller blades and contracting in the balance of the circumference of said rotor to form a turbine space, means for burning fuel between said air-receiving and said turbine space at the larger parts thereof, an inlet in one side wall to said air-receiving space, and an outlet from said turbine space in the opposite wall, said inlet and outlet overlapping at the contracted part of said casing diametrically opposite said fuel burning means and said impeller blades being inclined sidewise forwardly toward the edge nearer the said inlet opening to cause a sidewise scavenging current from said inlet to said outlet where they overlap.

4. The turbine of claim 1 in which the outer edges of said impeller blades are curved backwardly from the direction of movement of said blades.

5. An internal combustion turbine which comprises a rotor having impeller blades at spaced intervals about its periphery, a casing having a compressor compartment and a turbine compartment on diametrically opposite sides of said rotor and a combustion zone between said compartments, said compressor compartment enlarging in diameter to said combustion zone and said turbine compartment decreasing in diameter from said combustion zone, an inlet to said compression compartment near the bases of said vanes and an outlet from said turbine compartment near the base of said vanes and a burner in said combustion zone comprising a number of spaced fuel passages and spaced outlets from said passages into the air passing from said compressor compartment to said turbine compartment, a heat interchanger between said combustion zone and said compressor compartment and means for interchanging heat between the exhaust gases from said turbine compartment and air passing through said combustion zone and means for supplying a quantity of fuel with said air from said compressor compartment to said heat interchanger.

WILLIAM E. TRUMPLER.